United States Patent [19]
Nozaki

[11] Patent Number: 5,155,938
[45] Date of Patent: Oct. 20, 1992

[54] DOOR GLASS RUN FOR MOTOR VEHICLE
[75] Inventor: Masahiro Nozaki, Inazawa, Japan
[73] Assignee: Toyoda Gosei Co., Ltd., Nishikasugai, Japan
[21] Appl. No.: 701,036
[22] Filed: May 16, 1991
[30] Foreign Application Priority Data May 17, 1990 [JP] Japan .................. 2-51693[U]

[51] Int. Cl.$^5$ .................................. E06B 7/23
[52] U.S. Cl. ........................... 49/441; 49/479
[58] Field of Search ............ 49/440, 441, 374, 379, 49/488

[56]         References Cited
        U.S. PATENT DOCUMENTS

| 3,958,369 | 5/1976 | Mathellier | 49/479 |
| 4,616,446 | 10/1986 | Okamoto . | |
| 4,769,947 | 9/1988 | Ogawa et al. . | |
| 4,785,584 | 11/1988 | Kisanuki et al. . | |
| 4,817,336 | 4/1989 | Kisanuki . | |
| 4,884,370 | 12/1989 | Nozaki et al. . | |
| 4,894,953 | 1/1990 | Nozaki . | |
| 4,894,954 | 1/1990 | Nazaki et al. | 49/479 |
| 4,908,989 | 3/1990 | Omura et al. . | |
| 4,910,918 | 3/1990 | Naples et al. | 49/441 |
| 4,910,919 | 3/1990 | Kisanuki et al. . | |
| 4,928,431 | 5/1990 | Kuzuhara et al. | 49/479 |

4,977,706 12/1990 Kisanuki .

FOREIGN PATENT DOCUMENTS 147921 9/1982 Japan ........................... 49/479

Primary Examiner—Richard E. Moore
Assistant Examiner—Jerry Redman
Attorney, Agent, or Firm—Cushman, Darby & Cushman

[57]            ABSTRACT

A door glass run to be attached along an inner periphery of a door sash of a motor vehicle. The door glass run has an extruded lateral member to be attached along a lateral frame portion of the door sash, an extruded vertical member to be attached along a vertical frame portion of the door sash, and a molded corner portion connecting a rear end of the lateral member to an upper end of the vertical member. The lateral member and the molded corner portion have a continuous tubular seal portion to be pushed by the peripheral edge of the door glass when the door glass is fully closed. An end of the tubular seal portion opens at an opening formed in a vertically extending wall of the molded corner portion. A rib is formed integrally with the vertically extending wall of the molded corner portion so as to extend across the opening, thereby increasing the rigidity of the molded corner portion.

3 Claims, 4 Drawing Sheets

DOOR GLASS RUN FOR MOTOR VEHICLE

BACKGROUND OF THE INVENTION

1. Field of the Invention

The present invention relates to a door glass run for a motor vehicle.

2. Description of the Prior Art

As shown in FIG. 4, a door glass run 4 is attached to an inner periphery of a door sash 2 of a door 1 of a motor vehicle for guiding a door glass 3 to its closed and open positions, and sealing a gap between a peripheral edge of a door glass 3 and the door sash 2 when the door glass 3 is fully closed.

As shown in FIGS. 5 and 6, the door glass run 4(hereinafter will be merely called glass run) is provided with a base portion 41 having a U-shaped cross-section and lips 44, 45 formed at open ends of the base portion 41 for holding the periphery of the door glass 3. The door sash 2 has a channel portion having a U-shaped cross-section in its inner peripheral portion. The base portion 41 of the glass run 4 is fitted to the channel portion of the door sash 2.

The glass run 4 is generally composed of an extruded lateral member 4A to be attached along a lateral frame portion of the door sash 2, an extruded vertical member 4B to be attached along a vertical frame portion of the door sash 2 and a molded corner portion 4C to be attached along a corner portion C of the door sash 2(FIG. 4). The molded corner portion 4C connects the lateral member 4A to the vertical member 4B(U.S. Pat. No. 4,977,706).

The lateral member 4A is generally provided with a tubular seal portion 40. When the door glass 3 is fully closed, a seal wall 46 of the tubular seal portion 40 is pushed upwardly by the peripheral edge of the door glass 3.

As shown in FIG. 6, the molded corner portion 4C is provided with a tubular seal portion 40' which is continuous with the tubular seal portion 40 of the lateral member 4A. One end of the seal wall 46' of the tubular seal portion 40' is connected to the seal wall 46 of the lateral member 4A while the other end thereof is connected to a lower end portion of a vertically extending bottom wall of a base portion 41' of the molded corner portion 4C.

The lateral member 4A is connected to the vertical member 4B with the molded corner portion 4C in the following manner. Ends of the members 4A, 4B are placed at both ends of a cavity of a mold so as to face in nearly perpendicular relation to each other, a core for molding the tubular seal portion 40' is inserted in the cavity, and a molding material is injected into the cavity. The resulting corner portion 4C has an opening 47 for removing the core from the tubular seal portion 40'. When the glass run having the molded corner portion 4C is attached to the door 1, the opening 47 is covered with the door sash 2 so as to be concealed from an external view of the motor vehicle.

However, due to the opening 47, the rigidity of the molded corner portion 4C decreases. This causes the corner portion 4C to be irregularly deformed when fitted to the door sash 2. As a result, the corner portion 4C is likely to be offset from a predetermined assembly position, which thereby reduces the sealing properties of the seal wall 46' against the door glass 3.

On the other hand, the assembled positions of the door glass can vary upwards or downwards. In a conventional glass run as shown in FIGS. 5 and 6, when the seal wall 46' is pushed excessively upwards by the fully closed door glass 3 that is assembled at an upwardly offset position, the lip 44 is easily deformed due to a lack of rigidity of the corner portion 4C. This causes the appearance around the molded corner portion 4C to be deteriorated.

SUMMARY OF THE INVENTION

It is an object of the present invention to provide a glass run wherein a molded corner portion having an opening for removing a core is prevented from being offset as it is assembled onto the door, and is prevented from being deformed when the door glass is fully closed.

The door glass run in accordance with the present invention comprised of an extruded lateral member to be attached along a lateral frame portion of a door sash of a motor vehicle, an extruded vertical member to be attached along a vertical frame portion of the door sash, and a molded corner portion for connecting a rear end of the lateral member to an upper end of the vertical member. In both the lateral member and the molded corner portion, tubular seal portions are continuously formed. An end of the tubular seal portion of the molded corner portion opens to allow removal of a core used in molding the corner portion therefrom. A rib is formed in the molded corner portion so as to extend across the resulting opening, thereby increasing the rigidity of the molded corner portion.

BRIEF DESCRIPTION OF THE DRAWING

Other objects, features and characteristics of the present invention will become apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Figure 1:
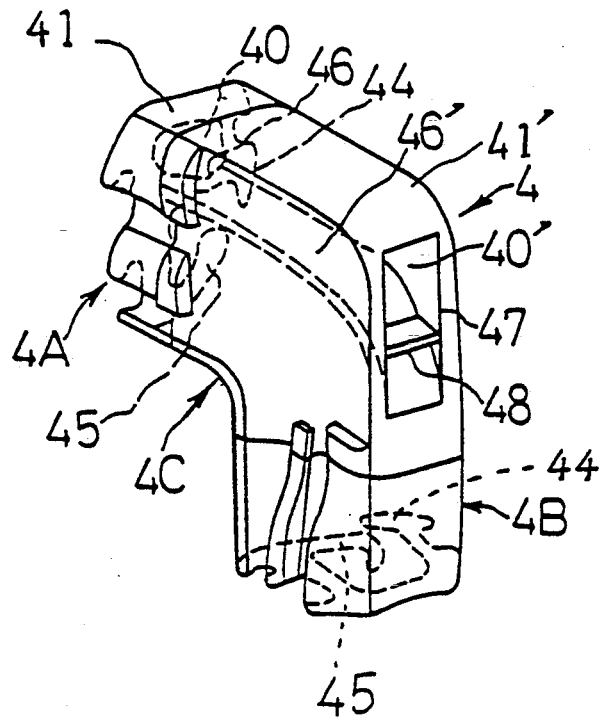
FIG. 1 is a perspective view of a molded corner portion of a first embodiment of a door glass run in accordance with the present invention.
Figure 2:
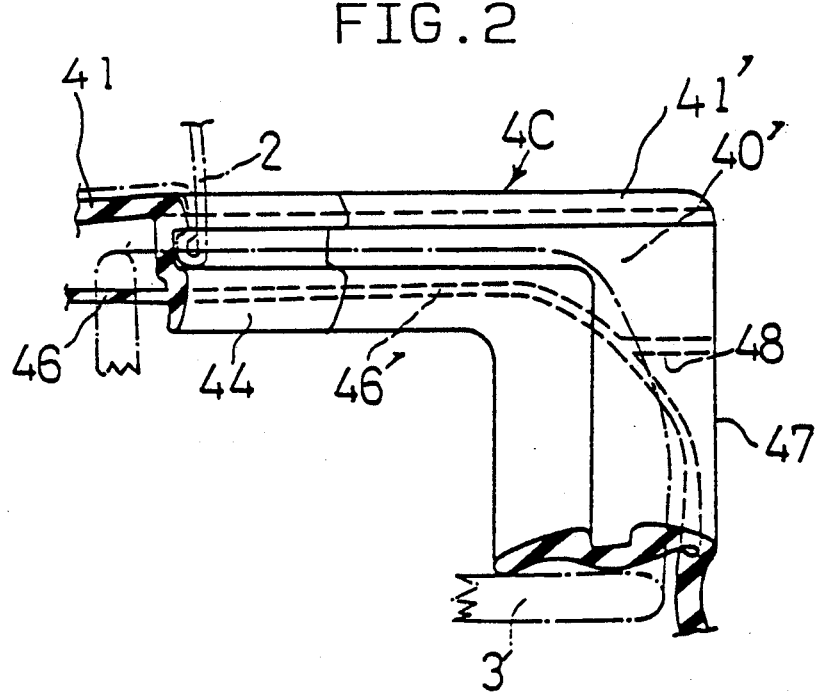
FIG. 2 is a partially cross-sectional perspective view of the molded corner portion of the first embodiment of the door glass run as seen in another direction.

Hereinafter, embodiments of the present invention will be explained with reference to FIGS. 1 and 2.

A glass run 4 is composed of a lateral member 4A and a vertical member 4B, which are respectively formed of rubber by extrusion and which are connected to each other with a molded corner portion 4C. The lateral and vertical members 4A, 4B are respectively provided with a base portion 41 having a nearly U-shaped cross-section, and lips 44, 45 which are formed along ends of side walls of the base portion 41. An inner side wall of the base portion 41, which is located inside the vehicle body, has a width greater than the outer side wall thereof. The molded corner portion 4C has a base portion 41' of a U-shaped cross section of which the shape gradually changes from the sectional shape of the lateral member 4A to that of the vertical member 4B. The lips 44, 45 are respectively formed along the ends of the base portion 41' so as to be continuous with those of the lateral and vertical members 4A, 4B.

The lateral member 4A has a seal wall 46 which connects an end of the outer side wall of the base portion 41 to a middle of the inner side wall thereof. The seal wall 46, a bottom wall and the inner and outer side walls of the lateral member 4A compose a tubular seal portion 40.

When the door glass 3 is raised to a fully closed position, the seal wall 46 of the lateral member 4A is pushed by the door glass 3. The outer lip 44 is pulled up by the seal wall 46, and abuts the outer surface of the door glass 3.

The molded corner portion 4C has a seal wall 46' which is continuous with the seal wall 46 of the lateral member 4A. The seal wall 46' of the molded corner portion 4C curves in conformity to the corner of the door glass 3, and is connected to a lower end portion of a vertically extending bottom wall of the corner portion 4C. The seal wall 46', the bottom wall and both side walls of the corner portion 4C compose a tubular seal portion 40'. The tubular seal portion 40' has such a configuration that gradually enlarges towards the vertically extending bottom wall of the molded corner portion 4C along the curving seal wall 46'. In the vertically extending bottom wall of the corner portion 4C, an opening 47 for removing a core used in molding the corner portion 4C is formed from its upper end to its lower end.

At a vertical middle of the opening 47, a plate-shaped rib 48 is formed so as to divide the opening 47 into an upper half and a lower half. This rib 48 integrally connects the seal wall 46' and both side walls to one another, and is integrally formed with the corner portion 4C by molding.

The rib 48 gives the molded corner portion 4C rigidity, especially widthwise rigidity. Therefore, when the base portion 41' of the molded corner portion 4C including the tubular seal portion 40' is fitted to the door sash 2, the base portion 41' is prevented from being deformed. Moreover, when the seal wall 46' is excessively pushed by the corner portion of the door glass 3, the outer lip 44 of the molded corner portion 4C is prevented from being deformed by virtue of the rigidity of the base portion 4'.

Accordingly, good appearance and sealing properties of the molded corner portion 4C can be maintained.

Figure 3:
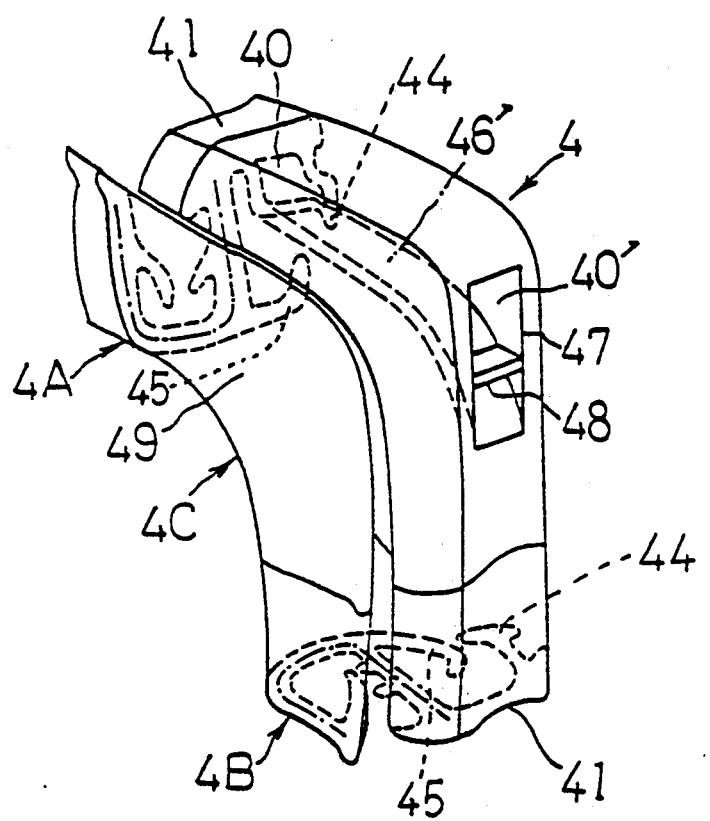
FIG. 3 is a perspective view of a molded corner portion of a second embodiment of the door glass run in accordance with the present invention.
Figure 4:
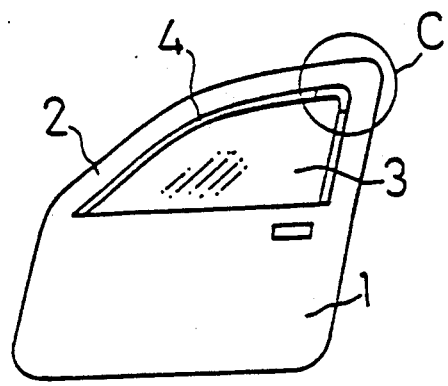
FIG. 4 is a front view of a door of a motor vehicle provided with a door glass run.
Figure 5:
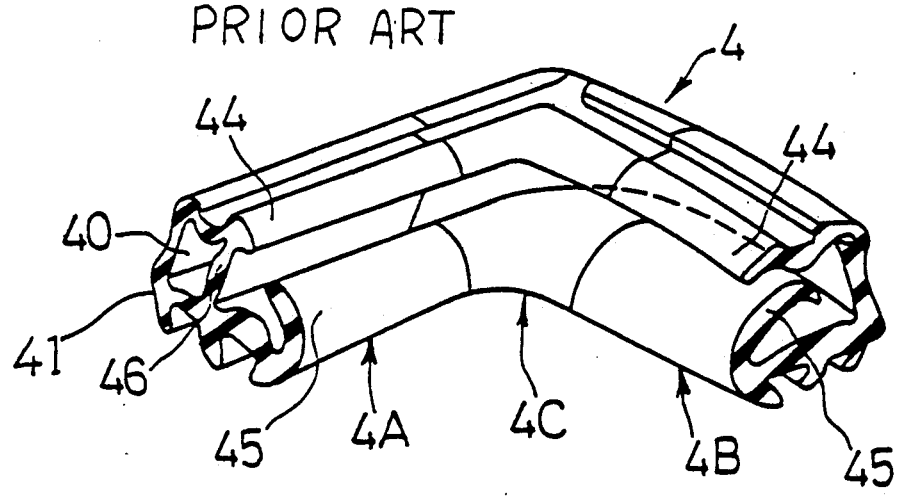
FIG. 5 is a partially cross-sectional perspective view of a molded corner portion of a conventional door glass run.
Figure 6:
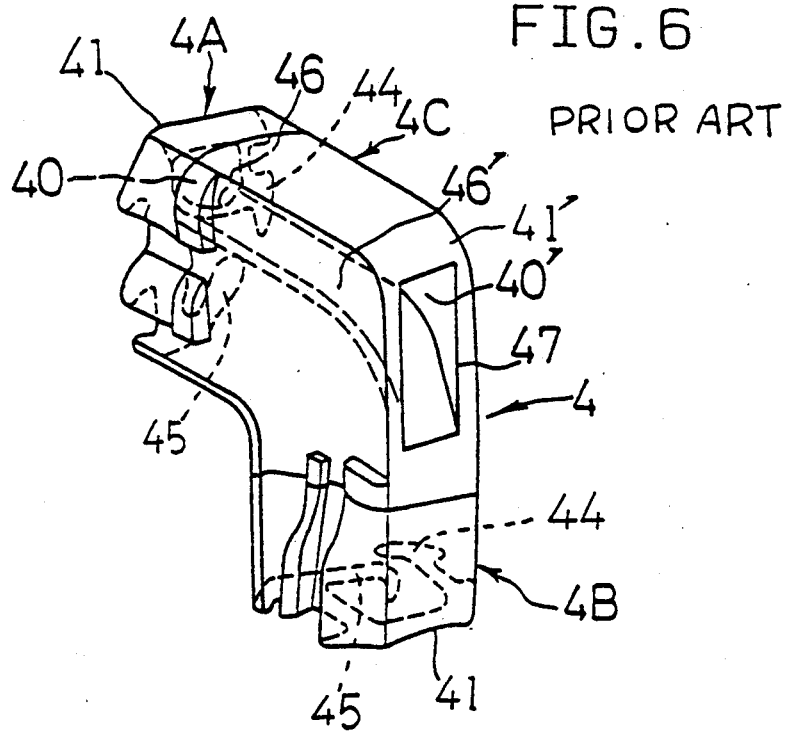
FIG. 6 is a perspective view of the molded corner portion of the conventional door glass run as seen in another direction.

FIG. 3 illustrates a second embodiment of the present invention. In the second embodiment, the glass run 4 has a trim portion 49 having a U-shaped cross-section, which is integrally formed with the base portion 41. The trim portion 49 of the glass run 4 of the second embodiment is attached to a flange formed along the door frame. The remainder of the structure of the door glass run of the second embodiment is substantially identical to that of the first embodiment.

In the second embodiment, the rib 48 is formed in the molded corner portion 4C like the first embodiment. The second embodiment has similar operational effect as that of the first embodiment.

The present invention is not limited to the preceding embodiments. The present invention is applicable to other type of glass run of which a molded corner portion has an opening from which a core used in forming a tubular seal portion is removed.

What is claimed is:

1. A door glass run to be attached along an inner periphery of a door sash of a motor vehicle for sealing a gap between a peripheral edge of a door glass and the door sash when the door glass is fully closed, comprising:

an extruded lateral member including means for attaching said lateral member along a lateral frame portion of the door sash;

an extruded vertical member including means for attaching said vertical member along a vertical frame portion of the door sash; and a molded corner portion connecting a first end of said lateral member to a first end of said vertical member;

said lateral member and said molded corner portion having a continuous tubular seal portion that is pushed by the peripheral edge of the door glass when the door glass is fully closed, said molded corner portion having an opening at which an end of said tubular seal portion of said molded corner portion opens, and a rib being formed integrally with said molded corner portion so as to extend across said opening;

wherein said tubular seal portion includes a bottom wall that curves downward as it approaches said opening and said rib is connected to the bottom wall.

2. A door glass run to be attached along an inner periphery of a door sash of a motor vehicle for sealing a gap between a peripheral edge of a door glass and the door sash when the door glass is fully closed, comprising:

an extruded lateral member including means for attaching said lateral member along a lateral frame portion of the door sash;

an extruded vertical member including means for attaching said vertical member along a vertical frame portion of the door sash; and a molded corner portion connecting a first end of said lateral member to a first end of said vertical member;

said lateral member and said molded corner portion having a continuous tubular seal portion that is pushed by the peripheral edge of the door glass when the door glass is fully closed, said molded corner portion having an opening at which an end of said tubular seal portion of said molded corner portion opens, and a rib being formed integrally with said molded corner portion so as to extend across said opening;

wherein said glass run includes a continuous base portion having a U-shaped glass run includes a continuous base portion having a U-shaped cross section, and lips formed along edges of side walls of said base portion for holding a periphery of the door glass when the door is fully closed, wherein said lateral member and said molded corner portion are respectively provided with a seal wall connecting said side walls of said base portion to each other, said seal wall being tightly pressed by the peripheral edge of the fully closed door glass, wherein said tubular seal portion includes said seal wall and said base portion, said seal wall of said molded corner portion having a configuration that curves downwards so that said configuration conforms to a corner portion of the door glass, wherein said opening is formed in a vertically extending bottom wall of said base portion of said molded corner portion, said rib is formed at a vertical middle of said opening such that said opening is divided into an upper half and a lower half.

3. The door glass run according to claim 2, wherein said tubular seal portion of said molded corner portion has a configuration that gradually enlarges from said lateral member to said vertically extending bottom wall of said base portion of said molded corner portion along said curving seal wall of the molded corner portion, and wherein said rib has a plate-like configuration, and connects said vertically extending bottom wall and said seal wall of said molded corner portion to each other.

* * * * *